June 13, 1967      F. C. DULMAGE      3,324,625
EQUIPMENT AND METHOD OF CONTROLLED PERIPHERAL SHRINK
Filed Oct. 11, 1963
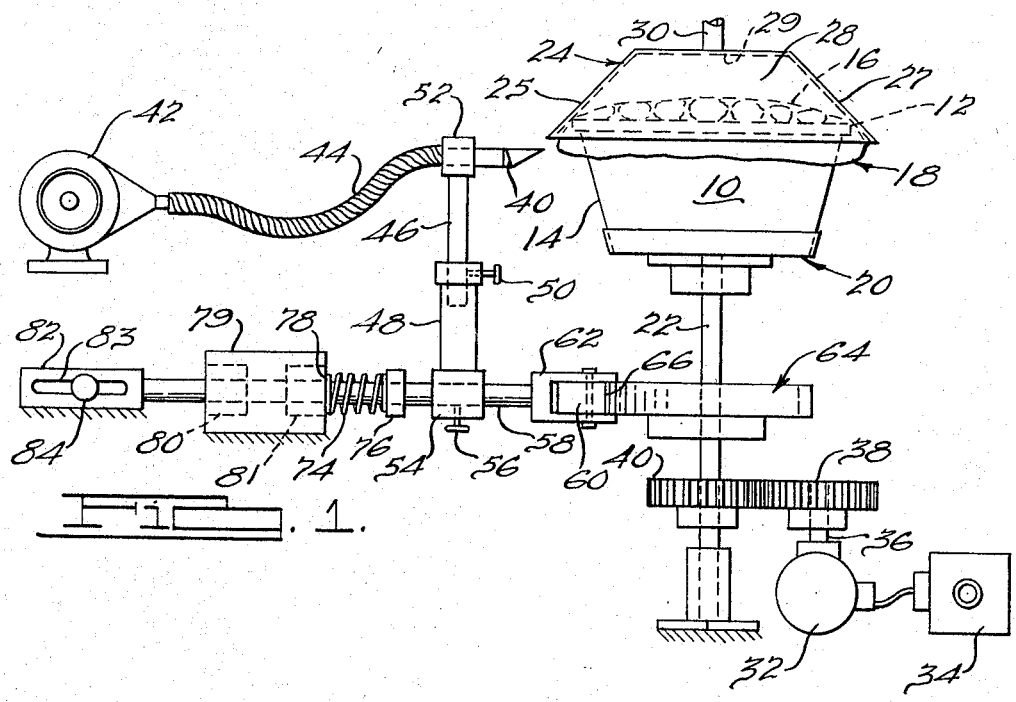
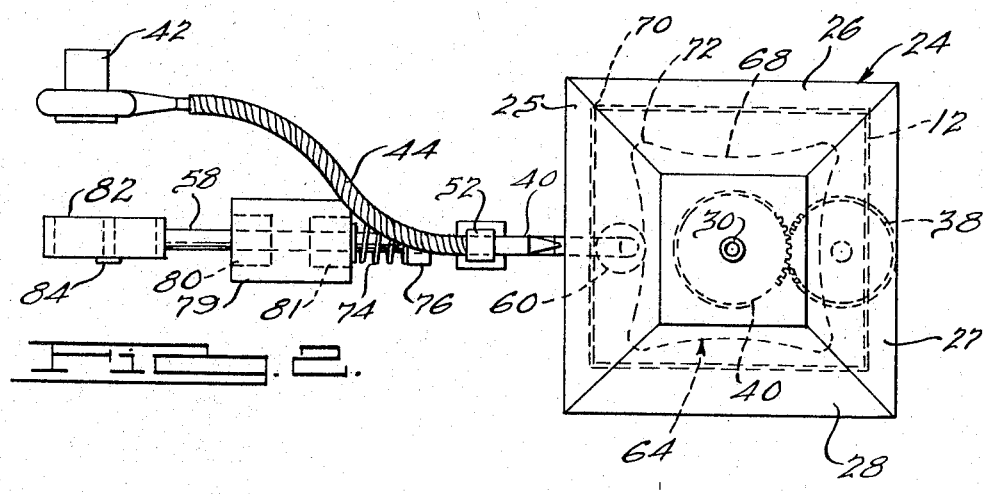
INVENTOR.
Fred C. Dulmage
BY
Jerome Rudy
ATTORNEY.

United States Patent Office 3,324,625
Patented June 13, 1967

3,324,625
EQUIPMENT AND METHOD OF CONTROLLED PERIPHERAL SHRINK
Fred C. Dulmage, Bay Village, Ohio, assignor to The Dow Chemical Company, Midland, Mich., a corporation of Delaware
Filed Oct. 11, 1963, Ser. No. 315,458
14 Claims. (Cl. 53—42)

This invention relates to apparatus and methods for forming closures and more particularly to methods and apparatus for forming closures by heat shrinkage of heat shrinkable plastic materials.

An object of this invention is to provide a method and apparatus for forming a closure by selectively applying heat to a heat shrinkable material mounted over a package or container on which the closure is to be formed.

Another object of this invention is to provide a method and apparatus for uniformly applying heat around the periphery of a container during formation of a closure by heat shrinkage of a heat shrinkable material.

A further object of this invention is to provide a method and apparatus for maintaining a predetermined relationship between a heat shrinkable material and a heat source during the application of heat to the heat shrinkable material.

Still another object of the present invention is to provide a method and apparatus for applying heat to a heat shrinkable material mounted on a container on which a closure is to be formed by the heat shrinkable material in accordance with the contour or configuration of the container.

An additional object of the present invention is to provide a method and apparatus for maintaining a predetermined relationship between a heat source and a heat shrinkable material mounted on a container on which a closure is to be formed from the heat shrinkable material, which relationship can be varied during the application of heat to the heat shrinkable material to obtain maximum results.

The aforementiond object, and others, are attained by utilization of the inventive principles hereinafter disclosed in detail by reference to an illustrative embodiment of the invention shown on the accompanying drawing, wherein:

FIGURE 1 is a diagrammatic side elevational view of the apparatus embodying the principles of the invention; and FIGURE 2 is a diagrammatic plan view of the apparatus shown in FIG. 1.

Referring now to the drawings, a package or container 10 is illustratively shown in a form typical of a conventional berry box or the like having a square cross sectional configuration in plan elevation. A rim portion 12 surrounds the top of the container which has downwardly inwardly sloping side walls 14. The container is shown to be filled with produce 16 or other material extending above the rim 12 of the container. Container 10 is intended to be merely illustrative of any of many types of containers on which closures may be formed from heat shrinkable material. Consequently, the container 10 could, for example, have other polygonal cross sectional configurations, have straight side wall portions, be round, have a round beaded lip, or have the contents contained completely within the confines of the container and not protruding above the rim.

A piece of heat shrinkable material 18 is placed over the upper surface of the container and the produce. The heat shrinkable material is sufficiently large to enable portions of the material to extend over the rim of the container and form a continuous skirt around the periphery thereof which extends downwardly a sufficient distance to enable the heat shrinkable material to be shrunk onto the rim of the container and/or the adjacent side surface of the container. At least some portions of the skirt will be pleated or undulated due to the excess of material in the skirt portion relative to the rim area of the container. Any commercially avialable heat shrinkable material may be utilized such as for example the relatively thin, i.e. 0.5 mil to 1.5 mils, packaging films of polyethylene, polyvinyl chloride, polypropylene, polystyrene, polyester, polyvinylidene chloride, etc. The heat shrinkable material is preferably biaxially oriented and has a high shrink energy. However, other heat shrinkable materials may also be suited for use with the method and apparatus to be hereinafter described.

Support means are provided to support the container 10 during the formation of the closure and comprises, in the preferred embodiment, a jig or fixture 20 in the form of a turntable adapted to be mounted on and rotatably driven by a shaft 22. A holding means 24 is provided on the container rim and includes tapered side walls 25, 26, 27, 28 which extend downwardly below the rim of the container 12. The cross sectional configuration of the holding means in plan view substantially corresponds to the cross sectional configuration of the container. A substantial cavity 29 is provided in the upper part of the holding means to insure that the goods in the container 10 are not contacted or crushed by the holding means.

Suitable means 30 for moving the holding means 24 relative to the container 10 may be provided at the top of the holding means. If the operation is to be done manually, a handle may be placed at the top of the holding means, and if the operation is to be done automatically, the holding means may be attached to suitable automatically operated equipment, such as a fluid operable cylinder, which is operative to cause raising and lowering of the holding means.

Drive mechanism is provided for rotating the turntable 20 and the container 10 at a regulated speed and comprises a gear motor 32 having a conventional speed regulator 34 and being drivingly connected to the shaft 22 through a motor shaft 36 and gears 38, 40. The speed regulator may be such as to provide uniform rotation or variable rotation of the turntable.

Heat applying means are provided to apply heat to the heat shrinkable material around the entire periphery of the container adjacent the rim portion 12. In the preferred embodiment, the heat applying means is shown to comprise a hot air nozzle 40 connected to a hot air source 42, such as a conventional combination heater and blower unit, by a length of flexible hose 44. The position of the nozzle 40 relative to the container 10 and the shrinkable material supported thereon is variably adjustable. Nozzle 40 is adjustable in a direction parallel to the central axis of rotation of the container, defined by the shaft 22, to position the nozzle adjacent the rim of the container. Support post means 46, 48 are telescopically adjustable to any of a plurality of adjusted positions by means of a suitable fastening device 50. Nozzle 40 is mounted on support post 46 by a suitable coupling 52.

Means for controlling the radial location of the nozzle 40 relative to the central axis of rotation of the shaft 22 are connected to the support post means by means of an adjustable coupling 54 and an adjusting screw 56. A shaft 58 slidably supports the coupling 54 and is reciprocably movable along an axis extending transversely and radially to the central axis of rotation of shaft 22. A cam follower in the form of a roller 60 is mounted on one end of the shaft 50 in a clevis member 62. Cam means 64 are fixedly secured to the shaft 22 and abuttingly engage the cam follower as indicated at 66.

The shape of the cam 64 is such as to provide a desired spatial relationship between the nozzle 40 and the periphery of the container 10 and the heat shrinkable material 18. For example, the shape of the cam may be similar to that shown in FIG. 2 for a container of the size and shape shown. The cam contour is shown to generally follow the contour of the container and to have four equal sides which include curved central portions 68 extending along the side walls of the container. The curved central portions are concave and are gradually outwardly curved as the intersections 70 of the side walls of the container are approached. Ears or lobes 72 connect the curved central portions 68 and correspond in location to each of the four corners of the container. In the illustrative embodiment, the cam serves to maintain the nozzle 40 at a relatively uniform average distance from the periphery of the container and the heat shrinkable material as the container and heat shrinkable material are rotated to the nozzle. The nozzle is closest to the container along the central side wall portions of the container and furthest from the container adjacent the container corners 70. The cam may be variously configured to obtain any desired heat shrinking results. If it is desirable to apply more heat at some areas relative to other areas during the travel of the nozzle 40 relative to the container 10, the spacing of the nozzle from the container can be varied so that different temperature results and different heat shrinking results are attained at different areas along the container.

In order to bias the cam follower 60 into the cam 64, a spring means 74 is abuttingly engaged on a collar 76 fixed to the shaft 58 at one end and is abuttingly engaged against a shaft guide block 78 at the other end. The shaft guide block may be provided with ball bushings 80, 81 to permit movement of the shaft 58 relative thereto. The other end of the shaft 58 may be suitably supported by lost motion mechanism, or the like, comprising a support block 82 having an elongated slot 83 therein within which a roller 84 or other guide attached to the shaft 58 may be movably received.

In the illustrative method of forming a closure on the container 10 by the controlled application of heat to the periphery of the heat shrinkable material 18, the heat shrinkable material is first suitably positioned on the container 10, as hereinbefore described, either by movement of the material onto the container or by movement of the container into the material or by some equivalent or combination movement therebetween. The heat shrinkable material can be placed on the container 10 either before or after the container is placed on the turntable 20. Similarly, the shield 24 can be placed in the position shown in FIG. 1 in association with the heat shrinkable material and the container either before or after the container is placed on the turntable. The heat shrinkable material 18 may actually be carried to the container 10 by the shield 24 by the provision of vacuum or other suitable holding means for the sheet. However, in the preferred embodiment, the shrinkable material is first placed over the container 10 and then the shield 24 is applied thereto to hold the heat shrinkable material on the rim 12 of the container.

It will be seen, that by providing a shield 24 having a cross section corresponding to the cross sectional configuration of the container and having sloping side surfaces, the shield may be readily positioned on the container without application of force to the contents of the container or without distortion or displacement of either the heat shrinkable material or the container. In other words, the inner tapered surface of the shield provides a centering means which insures that the container will be suitably positioned relative to the shield with equal uniform peripheral engagement of the heat shrinkable material on the rim 12 and on the adjacent surface of the shield. The contact area on the heat shrinkable material between the shield and between the container will be substantially line contact.

The cavity 28 in the shield enables containers filled above the rim to have closures formed thereon without damage to the contents or container. The shield also provides for selective shrinkage in that the application of heat to the heat shrinkable material is confined primarily to the skirt. Thus, the center portion of the heat shrinkable material will not be completely shrunk after the application of heat to the skirt and may subsequently be heated and shrunk to tighten the closure. The support shaft 30, or other suitable means, for the shield 24 will be, of course, suitably rotatably supported so that the shield may rotate with the container 10.

After the shield, the heat shrinkable material, and the container have been positioned on the turntable 20 as shown in FIG. 1, the motor 32 may be started either manually or automatically by associated control circuitry to rotate the container, the heat shrinkable material, and the shield relative to the nozzle 40 about the axis of rotation of the shaft 22. The speed regulator 34 may be adjusted to obtain the desired rate of travel of the heat shrinkable material relative to the air nozzle 40 so that the desired shrinking results are attained. The shrinking results will, of course, be dependent on, among other things, the amount of heat applied to the heat shrinkable material and the amount of heat applied to the heat shrinkable material will be dependent upon the temperature of the air emanating from the nozzle 40, the distance of the nozzle 40 from the heat shrinkable material, the rate of movement of the heat shrinkable material, and the time of heat application which will be dependent upon the rate of movement of the container and the heat shrinkable material relative to the nozzle. Thus, in automatic operation, the various factors can be controlled to obtain optimum results and repetitive heat shrinking operations to form closures on containers by steps which will be substantially duplicated from container to container to provide uniform results from container to container. Suitable timing circuits and switches may be provided in associated automatic machinery to initiate rotation of the container as soon as the shield, the heat shrinkable material, and the container are in the proper position shown in FIG. 1. Thereafter, the motor 32 will be started and rotation of the container will begin. The blower 42 may thereafter be actuated to cause the discharge of a stream of hot air through the flexible tube 44 and the nozzle 40 against the periphery of the shrinkable material adjacent the rim 12 of the container. The motor will, preferably, cause slightly more than a complete revolution of the container relative to the nozzle to insure that the closure is properly formed. Of course, if desired, the system may be set up to cause several rotations of the container relative to the nozzle. Furthermore, the equipment may be automated so that only a single complete turn of the container relative to the nozzle will be sufficient to adequately form the closure on the container.

In any event, as the container 10 is rotated relative to the nozzle 40, the position of the nozzle 40 relative to the container is varied in accordance with the contour of the cam means 64. Cam follower 60 is maintained in constant engagement with the cam 68 by means of the spring 74 and reciprocates back and forth along an axis extending transversely to the axis of rotation of the container. Although the sides of the container are substantially straight, the contour of the cam 68 is curved to provide optimum results. Consequently, the spacing of the nozzle 40 from the container by use of the apparatus shown in the illustrative embodiment will result in variable displacement of the nozzle 40 inwardly and outwardly relative to the container. The average spacing from the container of the nozzle will approximate a predetermined optimum spacing relationship. As the cam follower moves around any of the lobes 72 of the cam, the nozzle 40 is positioned opposite the corners of the container. The nozzle may be positioned slightly further outwardly beyond the predetermined optimum distance at the corners because of the relatively longer exposure of the corner portions to the hot air. However, it will be readily appreciated that the heat shrinkable material will tend to produce more folds and tend to have more resistance to inward displacement at the corners. Since more of the heat shrinkable material will be gathered at the corners, additional heat may be required as compared with the single flat layer of the heat shrinkable material which will normally be presented along the straight side surfaces of the container. In the present invention, the configuration of the lobes of the cam 72 may be altered as necessary to obtain maximum shrinking results in the areas of maximum creasing and folding of the heat shrinkable material as determined by suitable tests with the particular container and the particular packaging material to be used for any given production setup. Suitable limit switches or other control devices may be mounted on or associated with the rotating shaft 22 to shut off the hot air blower 42 after the closure has been formed on the container.

It is contemplated that the subject method of forming closures on a container may be completely automated by providing for continuous rotation of the container support 20 and continuous actuation of the blower 42 with the container and the heat shrinkable material being automatically fed onto the moving support table and discharged therefrom after the formation of the heat shrinkable closure. Furthermore, the cam and cam follower apparatus shown may be replaced and varied as desired, and other types of follower means may be employed to move either the nozzle or the container relative to one another during the application of heat to control the distance therebetween. In other words, it may be desirable, in some applications, to maintain the nozzle 40 in a fixed relationship and move the container 14 along a contoured path to achieve the same results. The method and apparatus is also readily adaptable to the use of multiple nozzles 40 which might be located on opposite sides of the container and utilized to form a heat shrinkable closure by only a half turn or the like of the container 10.

Other variations and modifications of the subject method and apparatus are possible by variously applying the inventive principles disclosed. Therefore, it is intended that the scope of the appended claims be construed to include those changes, alterations, and modifications in the methods and apparatus illustratively disclosed which utilize the inventive principles.

The invention claimed is:
1. The method of forming a closure on a container by applying heat to heat shrinkable material comprising the steps of:
   (1) placing a piece of heat shrinkable material over a container and holding the heat shrinkable material only on the rim of the container;
   (2) rotating the container and the heat shrinkable material relative to a heat source located adjacent the container;
   (3) applying heat to the heat shrinkable material from the heat source; and
   (4) variably changing the relative positions of the container and the heat shrinkable material and the heat source during rotation of the container.

2. The method of forming a closure on a container by applying heat to a heat shrinkable material comprising the steps of:
   (1) mounting a piece of heat shrinkable material over the mouth of a container.
   (2) holding the heat shrinkable material in place on the container;
   (3) rotating the container and the heat shrinkable material as a unit relative to a heat source located adjacent thereto;
   (4) applying heat to the heat shrinkable material during rotation thereof; and
   (5) variably positioning the heat source relative to the container and the heat shrinkable material during rotation of the container and the heat shrinkable material.

3. The method of forming a closure on a container by the application of heat to a heat shrinkable material comprising the steps of:
   (1) holding a heat shrinkable material over the mouth of a container;
   (2) rotating the container and the heat shrinkable material about a common axis as a unit;
   (3) applying heat from a heat source to the heat shrinkable material as the container and the heat shrinkable material are rotated;
   (4) varying the position of the heat source relative to the heat shrinkable material as the container and the heat shrinkable material are rotated as a unit; and
   (5) changing the position of the heat source in accordance with the peripheral contour of the container.

4. Apparatus for forming a closure on a container by applying heat to a heat shrinkable material held thereon comprising means to rotate said container, means to apply heat to the heat shrinkable material during rotation of said container from a heat source, and means to vary the relative positions of the container and the heat source during rotation of the container.

5. Apparatus for applying heat to a heat shrinkable material on a container to form a closure for the container comprising: rotatable container support means, means for causing rotation of said support means, hot air nozzle means supported adjacent said container means, hot air blower means remotely spaced from said nozzle means, flexible hose means connecting said hot air blower means and said nozzle means and permitting movement of said nozzle means relative to said container, movable support means supporting said nozzle means, and means operable during rotation of said support means to cause adjustable movement of said air nozzle means relative to said container means.

6. Apparatus for forming a closure on a container by applying heat to a heat shrinkable material comprising:
   a turntable,
   means for rotating said turntable,
   an air nozzle for applying heat to said shrinkable material,
   adjustable means supporting said nozzle for movement relative to said container,
   cam means connected to said turntable and being movable therewith,
   and cam follower means connecting said adjustable means and said cam means to cause predetermined movement of said nozzle relative to said container during rotation of said turntable.

7. The apparatus as defined in claim 6 and wherein said cam means has a contour substantially corresponding to the contour of said container.

8. The apparatus as defined in claim 7 and wherein said contour comprises, for polygonal shaped containers, lobe means formed at the intersections of the sides of said container and curved cam portions extending substantially parallel to said side surfaces and connecting said lobe means.

9. Apparatus for applying heat to a heat shrinkable material on a container to form a closure for the container and comprising:
   a heating means,
   means adjustably supporting said heating means for adjustable movement in one direction,
   means adjustably supporting said heating means for adjustable movement in a direction transverse to said first direction,
   means movably supporting said heating means for movement relative to said container during the application of heat to said heat shrinkable material, cam means contoured generally to the configuration of the container, and means associated with said cam means to cause movement of said heating means relative to said container in accordance with the configuration of said cam means.

10. The invention as defined in claim 9 and said means movably supporting said heating means comprising:

a reciprocable member, cam follower means mounted on one end of said member and engaging said cam means, spring means biasing said cam follower into engagement with said cam means, and means movably supporting said reciprocable member for variable displacement during application of heat to the heat shrinkable material.

11. Apparatus for forming a closure on a container by applying heat to a heat shrinkable material positioned thereon and comprising:

support means to support said container, heating means to apply heat to the heat shrinkable material, means to cause a first relative movement between said support means and said heating means to apply heat to the heat shrinkable material around the periphery of the container, and means to cause a second relative movement between said support means and said heating means during the first relative movement to vary the relative positions of the container and the heating means during application of heat about the periphery of the container.

12. Apparatus for forming a closure on a container by applying heat to a heat shrinkable material positioned thereon and comprising:

support means to support said container, heating means to apply heat to the heat shrinkable material, means to cause a first relative movement between said support means and said heating means to apply heat to the heat shrinkable material around the periphery of the container, and spatial relationship controlling means operative to control the spatial relationship between said heating means and said container by causing a second relative movement between said heating means and said container during said first relative movement.

13. The method of forming a closure on a container by applying heat to a heat shrinkable material support on the container comprising the steps of:

(1) placing heat shrinkable material on a container adjacent a heat source;

(2) causing a first relative movement between the container and the heat source to apply heat to the heat shrinkable material on the container;

(3) applying heat to the heat shrinkable material during the first relative movement between the container and the heat source to form a closure;

(4) causing a second relative movement between the container and the heat source during the first relative movement; and (5) thereby maintaining a controlled predetermined spatial relationship between the container and the heat source during application of heat to the heat shrinkable material.

14. The method of forming a closure on a container by the application of heat to a heat shrinkable material comprising the steps of:

(1) positioning a heat shrinkable material over the mouth of the container;

(2) moving the container and the heat shrinkable material as a unit;

(3) applying heat from a heat source to the heat shrinkable material as the container and the heat shrinkable material are moved;

(4) varying the position of the heat source relative to the heat shrinkable material as the container and the heat shrinkable material are moved as a unit; and (5) changing the position of the heat source in accordance with the peripheral contour of the container.

References Cited

UNITED STATES PATENTS

| | | | |
|---|---|---|---|
| 2,796,913 | 6/1957 | Fener et al. | |
| 2,976,655 | 3/1961 | Dreyfus et al. | 53—42 |
| 3,034,271 | 5/1962 | Carpenter et al. | 53—329 |
| 3,200,561 | 8/1965 | Siegel et al. | 53—30 X |

TRAVIS S. McGEHEE, *Primary Examiner.*